April 5, 1932.  W. H. GRIMDITCH  1,852,882
RADIO CURRENT SUPPLY CIRCUIT
Filed Oct. 30, 1925
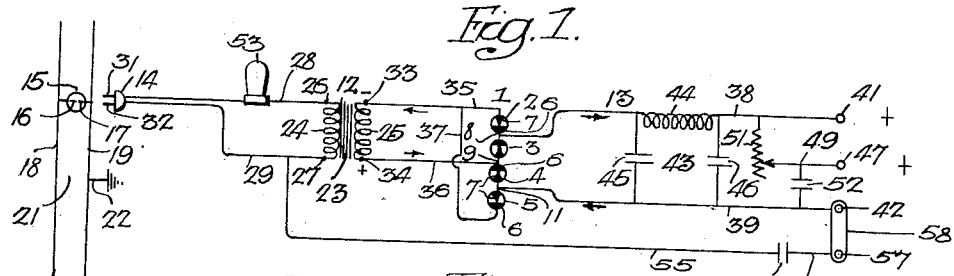
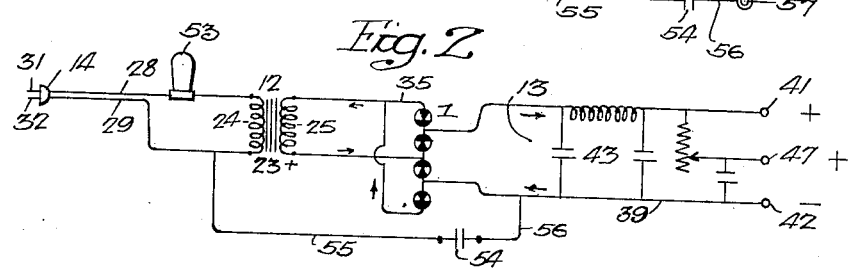
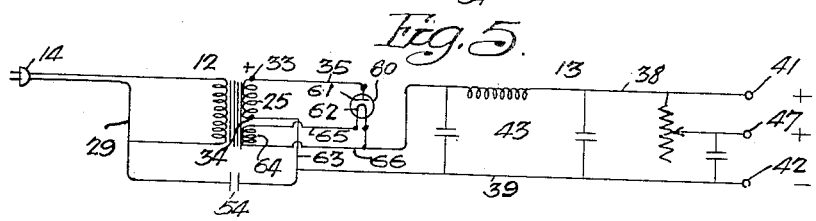
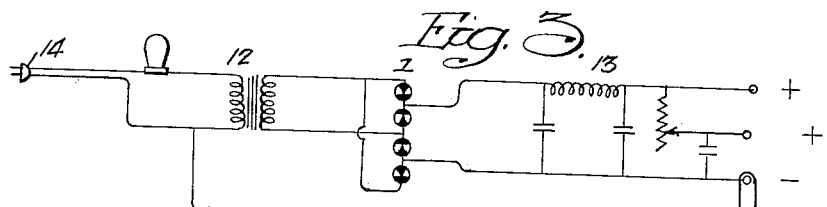
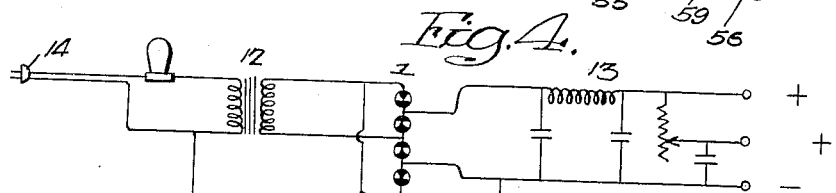
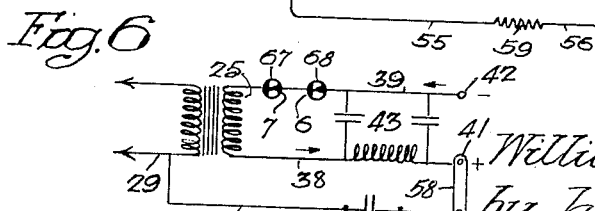
Inventor
William H. Grimditch
by his Attorneys
Howson & Howson Patented Apr. 5, 1932

1,852,882

UNITED STATES PATENT OFFICE

WILLIAM H. GRIMDITCH, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA

RADIO CURRENT SUPPLY CIRCUIT

Application filed October 30, 1925. Serial No. 65,875.

My invention relates to electrical systems, having particular relation to systems for rectifying alternating currents for radio uses.

One object of my invention is to provide a current supply device which shall be particularly characterized by the absence of undesirable sounds when associated with sensitive vacuum-tube circuits.

Another object of my invention is to provide a radio current supply device having highly desirable operating characteristics, comprising a transformer having primary and secondary circuits, a rectifier associated with said secondary circuit to furnish unidirectional current to the output terminals, and an impedance device for electrically connecting said primary circuit and one of the direct current output terminals.

Other objects and applications of my invention, as well as details of construction and operation, whereby my invention may be practiced, will be apparent more fully hereinafter, when taken in connection with the accompanying drawings, wherein Fig. 1 is a diagrammatic view of circuits and apparatus embodying my invention; and Figs. 2 to 6, inclusive, are similar views, but illustrating various modifications of my invention.

Referring to Fig. 1, a rectifier 1 comprises four cells, 2, 3, 4 and 5, which may be of any well-known design, such, for example, as the electrolytic or dry film-type cell. Each cell comprises a customary cathode 6 and anode 7. A conductor 8 serves to connect the cathodes of the cells 2 and 3. The anode and cathode of the cells 3 and 4 are connected by a conductor 9, while the anodes of the cells 4 and 5 are connected by a conductor 11.

The rectifier 1 may be considered to have an input circuit 12 and an output circuit 13, the former being connected to a reversible plug 14 adapted to be connected to a socket 15 having contact elements 16 and 17 respectively connected to conductors 18 and 19 of an alternating current supply circuit 21. The conductor 19 of this circuit may be provided with a conductor 22 connected to ground, representing standard practice in alternating current house supply wiring.

The input circuit 12 may include an inductive type transformer 23, comprising primary and secondary windings 24 and 25, respectively. The primary winding 24 is provided with terminals 26 and 27, which are respectively connected by conductors 28 and 29 to contact elements 31 and 32 of the reversible plug 14, the said contact elements being adapted to engage the socket elements 16 and 17. The secondary winding 25 is provided with terminal connections 33 and 34, and terminal 33 is connected by conductors 35 and 37 to the anode of cell 2 and the cathode of cell 5, while terminal 34 is connected by the conductors 36 and 9 to the anode of cell 3 and the cathode of cell 4.

The output circuit 13 comprises conductors 38 and 39, which respectively extends from the conductors 8 and 11 to direct current output terminals 41 and 42. These terminals represent the positive and negative B-circuit connections for a vacuum-tube receiving system.

The pulsations in the rectified current traversing conductors 38 and 39 are smoothed out or filtered by means of filter apparatus 43. This apparatus may comprise one or more inductive reactors 44 serially included in the conductor 38 and two or more capacitive reactors, 45 and 46, connected in shunt relation to the direct current load on opposite sides of the inductive reactor 44.

Inasmuch as the detector of the vacuum-tube system (not shown) operably associated with the binding-posts 41 and 42 may require a lower voltage than the amplifiers, a third binding-post 47 may be provided. This binding-post is connected to the positive conductor 38 through a fixed or variable resistor 51 and to the negative conductor 39 through a capacitive reactor 52.

When the plug 14 is inserted in the socket 18, alternating currents traverse the primary winding 24, and as a result alternating potentials are established in the secondary winding 25 of the transformer 23.

Assuming at any particular instant that the terminal 34 of the transformer winding 25 is positive, as marked, and the terminal 33 negative, then current flows from the transformer winding 25 through the terminal connection 34, the conductor 36, the cell 3, the conductor 38, the filter apparatus 43, the vacuum-tube circuits (not shown) or other direct current load associated with the binding posts 41, 42 and 47, the return conductor 39, the cell 5, and the conductors 37 and 35, to the terminal 33 of the transformer secondary winding 25.

On the other hand, when the polarity of the transformer windings reverses, the current traverses a circuit which extends from the transformer winding 25 through the conductor 35, the cell 2, the conductor 38, the filtering apparatus 43, the vacuum-tube or other load associated with the binding-posts 41, 42 and 47, the return conductor 39, the cell 4, and the conductor 36, to the transformer winding 25. Thus both half-waves of the alternating current cycle are rectified, and the filtering apparatus 43 functions in the usual manner to filter or smooth out the ripples of the rectified current.

Should the cells of the rectifier 1 temporarily fail to function or should these or any other units in the system break down or become short-circuited in operation, protection is afforded by means of a protective device 53, which preferably may be a metallic filament lamp. For a detail explanation of the protective device 53, reference is made to my co-pending application, Serial No. 64,184, filed Oct. 22, 1925.

In the operation of the above rectifying and filtering system under certain line conditions or in connection with certain types of radio receiving sets, difficulty has been experienced due to the presence of a hum. As a result of considerable experimental work, I have found that satisfactory operation of such sets may be obtained by connecting a capacitive reactor 54 of the order of 0.1 microfarad to the input and output circuits 12 and 13, as shown in Fig. 1, to by-pass all alternating current components of the rectified current by presenting low reactance to such components. One side of the condenser 54 may be connected by a conductor 55 to the conductor 29 of the primary circuit. The other side of the condenser 54 may be connected by a conductor 56 to a binding-post 57. The binding-post 57 may be connected at will to the conductor 39 of the output circuit 13, by means of a detachable conductor 58.

In operation, should satisfactory results not be obtained when the plug is inserted in the socket 15, it is merely necessary to connect together binding-posts 42 and 57 by means of the conducting link 58 and insert the reversible plug 14 in the socket 15 in that position with respect thereto which is found by trial to eliminate the hum or give improved results. The best position of the plug 14 in the socket 15 is usually found to be that in which the conductor 29 is connected through said plug and socket to the grounded line conductor 19, thus establishing a ground connection through the conductor 55, the condenser 54, the conductor 56, and the conducting link 58 to the conductor 39 of the output circuit and the radio receiving system operably associated therewith. The detachable link 58 is desirable because some radio receiving sets and certain line conditions are encountered where the results are better without this ground connection. In such cases the link 58 may be left off.

Fig. 2 differentiates from Fig. 1 in the fact that the binding-post 57 and the strap 58 are omitted, the conductor 56 being directly connected to the conductor 39 of the output circuit 13. The operation of this system is otherwise as described in connection with Fig. 1 except that to break the connection between the output conductor 39 and the primary conductor 29 it is necessary to remove the condenser 54 or break the circuit in conductor 55 or conductor 56.

The system disclosed in Fig. 3 is identical with that of Fig. 1, with the exception that the capacitive reactor 54 is replaced by a resistor 59, experience having shown that this form of impedance device also accomplishes the desired results.

Fig. 4 differentiates from Fig. 2 in the replacement of the capacitive reactor 54 by the resistive impedance device 59, and in this case, as in the case shown in Fig. 2, the impedance device should preferably be easily removable.

Fig. 5 illustrates another type of rectifying system to which the present invention is applicable. The system therein disclosed comprises a vacuum-tube rectifier 60 having an anode 61 and a cathode 62. The anode 61 is connected to the transformer terminal 33 by the conductor 35, as in the preceding figures. The transformer terminal 34 is connected by a conductor 63 directly to the conductor 39 of the output circuit.

The conductor 38 of the output circuit is connected to the filament 62 of the rectifying tube. The said filament 62 may be heated by an auxiliary transformer secondary winding 64 which is connected thereto by conductors 65 and 66.

Assuming at any instant that the terminal 33 of the secondary winding 25 is positive, then current passes from the terminal connection 33 through the conductor 35, the vacuum-tube 60, the conductor 38, the filtering means 43, the radio receiving circuits operably associated with the binding-posts 41, 42 and 47, the return conductor 39, and the conductor 63, to the terminal 34 of the transformer secondary winding. The impedance device 54 of the preceding figures may also be connected to the conductors 29 and 39. The rectification in this case is half-wave while in the preceding cases full-wave rectification circuits are shown, but the operation of the system is otherwise as described in connection with the preceding figures.

While the drawings show the primary conductor 29 connected through the impedance device to the negative side 39 of the output circuit, similar results may be obtained by connecting said primary conductor to the positive side 38 of the output circuit, as shown in Fig. 6. This circuit further differentiates from the preceding systems in the fact that a pair of film-type cells 67 and 68 are connected in series-circuit relation in the negative conductor 39, the anode 7 of the cell 67 being connected to the cathode 6 of the cell 68. The cathode of the cell 67 and the anode of the cell 68 are respectively connected to the transformer secondary winding and to the binding-post or terminal connection 42. The rectification in this case is half-wave, as in Fig. 5. The condenser or other impedance device 54 of the preceding figures may be connected to the conductor 29 through the conductor 55 and to the positive terminal connection 41 through the strap 58. The further operation is as set forth in the preceding figures.

While I have shown several embodiments of my invention, for the purpose of describing the same and illustrating its principles of construction and of operation, it is apparent that various changes and modifications may be made therein without departing from the spirit of my invention, and I desire, therefore, that only such limitations shall be imposed thereon as are indicated in the appended claims or as demanded by the prior art.

I claim:

1. An electrical system comprising an alternating-current supply socket, a transformer, a reversible plug for connecting said transformer to said socket, direct-current output terminals, a rectifier connected between said terminals and said transformer, current smoothing means for said rectifier, and an impedance device electrically connected to one of said terminals and to said plug.

2. A current-rectifying system comprising a transformer, a reversible plug connected to said transformer, direct-current output terminals, a rectifier electrically connected to said transformer and to said terminals, and an impedance device connected to one side of said reversible plug and to one of said terminals.

3. A current-rectifying system comprising a transformer, a reversible plug connected to said transformer, a plurality of direct-current terminals, a rectifier connected between said transformer and said terminals, an additional terminal, a removable connector for associating said additional terminal and one of said direct-current terminals, and an impedance device connected to said reversible plug and to said additional terminal.

4. A rectifying system comprising a source of alternating current, a transformer having primary and secondary circuits operatively associated therewith, a rectifier having its input connected to said secondary circuit and its output circuit connected through filter apparatus to a plurality of output terminals, and an impedance device having low reactance to said alternating current interconnecting said alternating current source and said output terminals, whereby disturbing currents occurring at said output terminals due to said alternating current source may be substantially eliminated.

5. A rectifying system comprising a source of alternating current, a transformer having primary and secondary circuits operatively associated therewith, a rectifier having its input connected to said secondary circuit and its output circuit connected through filter apparatus to a plurality of output terminals, and an impedance device having low reactance to said alternating current connected from said alternating current source to each of said output terminals through a capacity whereby disturbing currents occurring at said output terminals due to said alternating current source may be substantially eliminated.

6. A rectifying system comprising a source of alternating current, a transformer having primary and secondary circuits operatively associated therewith, a rectifier having its input connected to said secondary circuit and its output connected through filter apparatus to a plurality of output terminals, an additional terminal connected directly to one of said output terminals and through capacities to the other of said output terminals, and an impedance device having low reactance to said alternating current connected from the primary circuit of said transformer to said additional terminal whereby disturbing currents occurring at said output terminals due to said alternating current source may be eliminated.

7. A rectifying system comprising a source of alternating current, a transformer having its input leads connected to said source, and its output leads connected to a full-wave rectifier, output leads on said rectifier independent of said input leads, filter apparatus interposed between said output leads and output terminals, and a condenser connected to one of the primary leads and directly to one of the output terminals whereby disturbing currents occurring at said output terminals due to said alternating current source may be substantially eliminated.

WILLIAM H. GRIMDITCH.